United States Patent [19]

Mukasa et al.

[11] 4,134,430
[45] Jan. 16, 1979

[54] HIGH PRESSURE FUEL INJECTION PIPE

[75] Inventors: Masayoshi Mukasa, Shizuoka; Shigeaki Fujimaki, Numazu, both of Japan

[73] Assignee: Usui International Industry, Ltd., Shizuoka, Japan

[21] Appl. No.: 740,750

[22] Filed: Nov. 10, 1976

[51] Int. Cl.² ............................................. F16L 9/00
[52] U.S. Cl. ..................................... 138/109; 138/177; 138/178; 138/DIG. 11
[58] Field of Search .................. 138/44, 177, 178, 40, 138/109, DIG. 11; 29/157 R; 285/405

[56] References Cited
U.S. PATENT DOCUMENTS 2,590,688  3/1952  Crain .................................... 138/144

Primary Examiner—Houston S. Bell
Attorney, Agent, or Firm—Burns, Doane, Swecker & Mathis

[57] ABSTRACT

A high pressure fuel injection pipe is produced by squeezing an end portion of a small-diametered steel pipe member having a flow path extending through the center thereof to form a flow path of reduced diameter in the end portion communicating with the central flow path, pressing and plastically shaping the end portion into a frusto-conical or arcuate-surfaced connecting head, and grinding minute curve concavo-convex faces created in the inner surface of the flow path of reduced diameter during the plastic shaping to thereby form a flow path equal in diameter and communicating with the flow path in the small-diametered steel pipe member.

2 Claims, 8 Drawing Figures

FIG. 3A  FIG. 3B  FIG. 3C
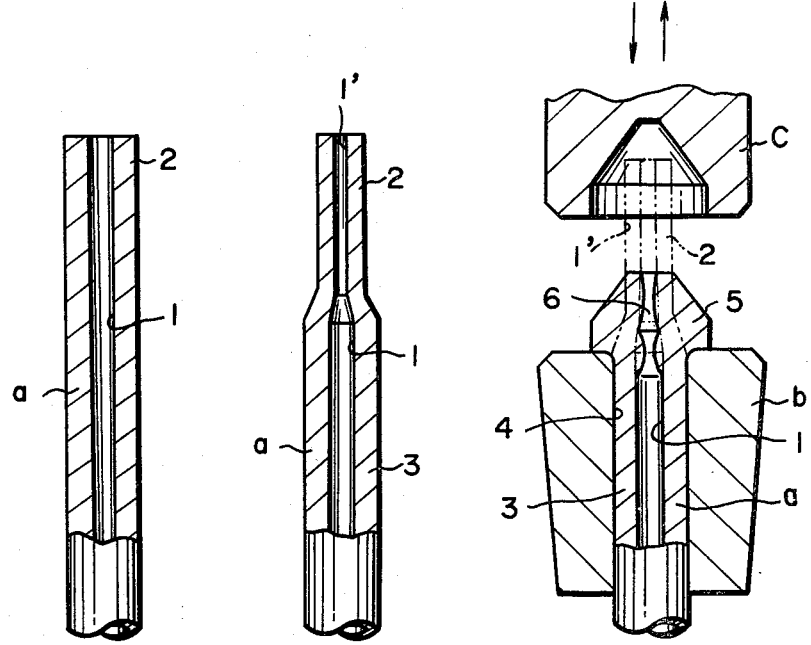
FIG. 3D  FIG. 3E
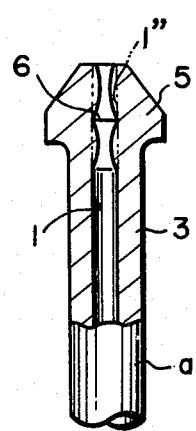 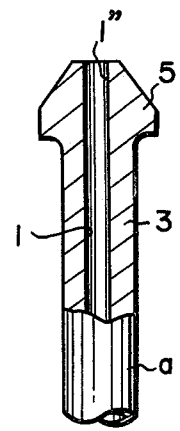

HIGH PRESSURE FUEL INJECTION PIPE

BACKGROUND OF THE INVENTION

1. Field of the Invention

This invention generally relates to a high pressure fuel injection pipe often used as a fuel supply line in automobiles or other Diesel engines and a method of making the same, and more particularly to a high pressure fuel injection pipe of which the high pressure fuel flow path is formed as a smooth flow path having a uniform diameter throughout the entire length thereof including the connecting head at the end portion of the injection pipe.

2. Description of the Prior Art

In the conventional high pressure fuel injection pipe, the connecting head thereof has been plastically shaped into a frusto-conical form or an arcuate surface form with the end portion of a thick-walled, small-diametered steel pipe member being projectedly held on a chuck and by the projected portion of the steel pipe member being butt-pressed with the aid of a shaping tool.

Such conventional high pressure fuel injection pipe, however, has suffered from a problem in that, as shown in FIG. 4 of the accompanying drawings, depressions 8 with numberless hair cracks created therein are locally formed in the inner peripheral wall surface 7 of the pipe adjacent the connecting head leading to a flow path 1 when the diameter is enlarged by the aforementioned butt-pressing. Such depressions cause pulsating of the fluid to be created by the high injection pressure so that the wall surfaces of these depressions are susceptible to progressive erosion by the pressure load, with a result that outwardly directed fracture or breakage is induced in the wall of the pipe to interfere with the operation of the engine, and there is a great desire to overcome this.

SUMMARY OF THE INVENTION

It is therefore an object of the present invention to provide a novel high pressure fuel injection pipe which is entirely free of the localized depressions which have heretofore been created in the inner peripheral surface of the pipe adjacent the connecting head due to the butt-pressure of a shaping tool during the shaping of such connecting head, thereby preventing progress of the erosion of the inner peripheral surface of the injection pipe and accordingly fracture or breakage of the injection pipe.

Such object of the present invention may be achieved by using a small-diametered steel pipe member having a flow path extending through the axis thereof as the blank for the injection pipe, squeezing an end portion of the small-diametered steel pipe member to form a flow path of reduced diameter communicating with the flow path, pressing and plastically shaping the end portion having the flow path of reduced diameter into a frusto-conical or arcuate-surfaced connecting head, and grinding minute curved concavo-convex faces created in the inner surface of the flow path of reduced diameter during the plastic shaping of the connecting head, by reamer or drill machining, to thereby form a smooth-surfaced flow path equal in diameter to and communicating with the axial flow path in the small-diametered steel pipe member.

The invention will become more fully apparent from the following detailed description thereof taken in conjunction with the accompanying drawings, throughout which identical reference characters designate identical or equivalent parts.

BRIEF DESCRIPTION OF THE DRAWINGS

FIGS. 3A to 3E are cross-sectional views illustrating the process of shaping according to the present invention.

DESCRIPTION OF THE PREFERRED EMBODIMENTS

Figure 1:
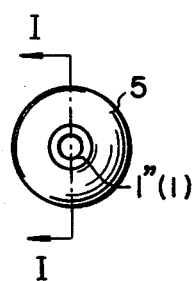
FIG. 1 is a front view of the high pressure fuel injection pipe according to the present invention.
Figure 2:
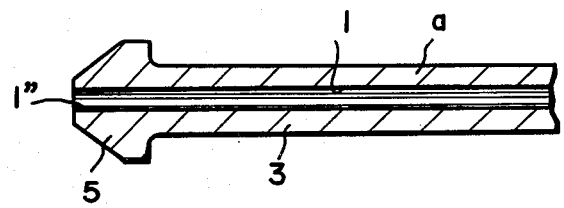
FIG. 2 is a cross-sectional view taken along line I—I in FIG. 1.
Figure 4:
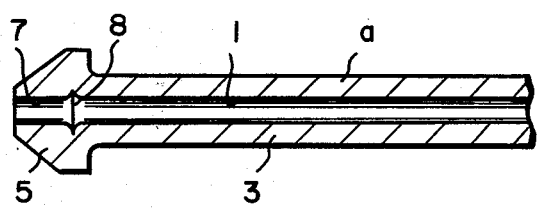
FIG. 4 is a longitudinal cross-sectional view of the high pressure fuel injection pipe according to the prior art.

As shown in FIG. 3A, a small-diametered steel pipe member a having a flow path 1 extending through the center thereof is used as the blank for the injection pipe. In the end portion 2 of the small-diametered steel pipe member a, a flow path 1' of reduced diameter communicating with the aforementioned flow path 1 is formed by squeezing, as shown in FIG. 3B. The end portion 2 having the flow path 1' of reduced diameter, as is shown in FIG. 3C, is pressed and plastically shaped into a frusto-conical or arcuate-surfaced connecting head 5. Minute curved concavo-convex faces formed in the inner surface of the flow path 1' of reduced diameter during the plastic shaping of the connecting head 5 are ground as by reamer or drill machining, as shown in FIG. 3D, to thereby provide a smooth flow path equal in diameter to and communicating with the central flow path 1 of the small-diametered steel pipe member a. Thus, there is obtained the high pressure fuel injection pipe as shown in FIG. 3E and FIGS. 1 and 2.

Another specific embodiment of the present invention will now be described. The end portion 2 of a thick-walled, small-diametered steel pipe member a having a flow path 1 extending through the center thereof is squeezed from outside thereof to form a flow path 1' of reduced diameter therewithin. Thereafter, the portion 3 of the thick-walled, small-diametered steel pipe member a which has the unreduced diameter is inserted into the supporting bore 4 in a chuck b, in the manner as shown in FIG. 3C, so that the treated end portion 2 is projectedly held outwardly of the chuck b. The projected end portion 2 is then butt-pressed by a shaping tool c such as punch metal or the like to thereby plastically shape a frusto-conical or arcuate-surfaced connecting head 5. Thereafter, minute curved concavo-convex faces 6 created in the inner surface of the head portion due to the squeezing are ground by reamer or drill machining to form a smooth flow path 1' communicating with the flow path 1 in the thick-walled, small-diametered steel pipe member a. Thus, there is provided the injection pipe as shown in FIG. 3E and FIGS. 1 and 2.

According to the present invention, a small-diametered steel pipe member a having a flow path 1 extending through the center thereof is used as the blank for the injection pipe. In the end portion 2 of the small-diametered steel pipe member a, a flow path 1' of reduced diameter communicating with the flow path 1 is formed by squeezing. The end portion 2 having the flow path 1' of reduced diameter is then pressed and plastically shaped into a frusto-conical or arcuate-surfaced connecting head 5. Minute curved concavo-convex faces created in the inner surface of the flow path 1' of reduced diameter during the plastic shaping of the connecting head 5 are ground as by reamer or drill machining to provide a smooth flow path equal in diameter to and communicating with the central flow path 1 of the small-diametered steel pipe member a. Thus, no localized depressions are formed in the inner wall surface of the finished injection pipe. More specifically, due to the flow path of reduced diameter being formed by pre-squeezing the connecting head, minute curved concavo-convex faces are only created in the inner surface of the connecting head during the shaping thereof effected with the aid of the butt-pressure of the shaping tool and there is formed no depression with numberless hair cracks created therein. The minute curved concavo-convex faces can be ground by reamer or drill machining, so that fracture or breakage which would otherwise result from the localized progressive erosion in the vicinity of the head can be prevented.

An example of the present invention will be shown below.

Steel pipe member: carbon steel pipe for high pressure piping (STS38), outer diameter 10mm, inner diameter 2.8mm Squeezing: outer diameter 8.3mm, inner diameter 1.6mm, length 15mm Setting of chuck surface: projection allowance 20mm Pressing for enlargement of diameter: hydraulic press Shape of connecting head: outer diameter 13.5mm, height 8mm, vertical angle 58°: frusto-conical shape Drilling: outer diameter 2.8mm, depth 15mm

What we claim is:

1. A high pressure fuel injection pipe having a flanged head and an axial fuel flow path with a substantially constant inner diameter along at least a portion of the length of said pipe, said fuel flow path being substantially smooth-surfaced and substantially free of hair line cracks, said pipe being formed by extraneously squeezing an end portion of a thick-walled, small-diametered steel pipe member having a flow path extending through the axis thereof to form a flow path of reduced diameter within said end portion, inserting the portion of said thick-walled, small-diametered steel pipe member which has the unreduced diameter into a supporting bore in a chuck so that said end portion of reduced diameter is projectedly held outwardly of said chuck, butt-pressing said projected end portion from outside thereof by means of a shaping tool such as punch metal or the like to plastically shape a frustoconical or arcuate-surfaced connecting head, and grinding minute curved concavo-convex faces created in the inner surface of said flow path of reduced diameter during the plastic shaping of said connecting head, to thereby form a smooth-surfaced flow path equal in diameter to and communicating with said axial flow path in said small-diametered steel pipe member, the grinding of said surface creating a flow path substantially free of hair line cracks.

2. A high pressure fuel injection pipe having a flanged head and an axial fuel flow path with a substantially constant inner diameter along at least a portion of the length of said pipe, said fuel flow path being substantially smooth-surfaced and substantially free of hair line cracks, said pipe being formed by the steps of providing a small diametered pipe blank having and axial flow path; squeezing an end portion of said pipe blank to form, in said end portion, a flow path of reduced diameter communicating with the remainder of said axial flow path; pressing and plastically shaping said end portion having the flow path of reduced diameter into a flanged connecting head, and grinding minute restrictions in the inner surface of said flow path of reduced diameter created during the plastic shaping of said connecting head to thereby form a smooth-surfaced flow path equal in diameter to and communicating with the remainder of said axial flow path in said small-diametered pipe, the removing of the minute restrictions creating a flow path substantially free of hair line cracks.

* * * * *

UNITED STATES PATENT AND TRADEMARK OFFICE
CERTIFICATE OF CORRECTION

PATENT NO. : 4,134,430

DATED : January 16, 1979

INVENTOR(S) : Masayoshi Mukasa & Shigeaki Fujimaki

It is certified that error appears in the above-identified patent and that said Letters Patent are hereby corrected as shown below:

Insert:

-- [30]  Foreign Application Priority Data

March 26, 1976    Japan........... 51-32444 --.

*Signed and Sealed this*

*Fifteenth* Day of *May 1979*

[SEAL]

Attest:

RUTH C. MASON
*Attesting Officer*

DONALD W. BANNER
*Commissioner of Patents and Trademarks*